(12) United States Patent
Benes et al.

(10) Patent No.: US 10,409,713 B2
(45) Date of Patent: Sep. 10, 2019

(54) CONTAINER TESTING USING A DIRECTORY AND TEST ARTIFACTS AND/OR TEST DEPENDENCIES

(71) Applicant: Red Hat, Inc., Raleigh, NC (US)

(72) Inventors: Eduard Benes, Brno (CZ); Matus Marhefka, Brno (CZ)

(73) Assignee: RED HAT, INC., Raleigh, NC (US)

( * ) Notice: Subject to any disclaimer, the term of this patent is extended or adjusted under 35 U.S.C. 154(b) by 135 days.

(21) Appl. No.: 15/597,809

(22) Filed: May 17, 2017

(65) Prior Publication Data
US 2018/0336123 A1 Nov. 22, 2018

(51) Int. Cl.
G06F 11/00 (2006.01)
G06F 11/36 (2006.01)
G06F 9/455 (2018.01)
G06F 8/61 (2018.01)

(52) U.S. Cl.
CPC ...... *G06F 11/3692* (2013.01); *G06F 9/45558* (2013.01); *G06F 11/3664* (2013.01); *G06F 11/3684* (2013.01); *G06F 11/3688* (2013.01); *G06F 8/63* (2013.01); *G06F 2009/45587* (2013.01)

(58) Field of Classification Search
CPC .................................................. G06F 11/3692
USPC ....................................................... 714/38.1
See application file for complete search history.

(56) References Cited

U.S. PATENT DOCUMENTS

| 6,292,909 B1 * | 9/2001 | Hare ................... H04L 41/0213 379/10.01 |
| 9,317,410 B2 | 4/2016 | Eilam et al. |
| 2008/0178043 A1 * | 7/2008 | Xu ...................... G06F 11/3688 714/32 |
| 2018/0075152 A1 * | 3/2018 | Zhang .................. G06F 9/5083 |

FOREIGN PATENT DOCUMENTS

WO 2017025203 2/2017

OTHER PUBLICATIONS

Crafting perfect Java Docker build flow; Alexei Ledenev; Mar. 22, 2017; https://codefresh.io/blog/java_docker_pipeline/; (29 pp.).

(Continued)

*Primary Examiner* — Sarai E Butler
(74) *Attorney, Agent, or Firm* — K&L Gates LLP

(57) ABSTRACT

A system for testing container applications includes a memory, a processor in communication with the memory, a test manager, and a test controller. The test manager runs on a host operating system and creates a test container image including test artifact(s) and/or test dependency(ies). Then, the test manager distributes a set of tests, which are accessible to a test container created from the test container image. The test manager distributes the tests by populating a directory with the set of tests and mounting the directory to the test container. Additionally, the test manager executes the test container image. The test controller is associated with the test container and executes the set of tests accessible to the test container using the test artifact(s) and/or the test dependency(ies). The test controller also monitors the set of tests executed by the test container. Feedback corresponding to the set of tests is provided.

20 Claims, 5 Drawing Sheets

(56) References Cited

OTHER PUBLICATIONS

Manage data in containers; https://docs.docker.com/engine/tutorials/dockervolumes/; [retrieved on May 1, 2017];(13 pp.).
Working with Docker Volumes; Hitesh Jethva; May 30, 2016; https://hostpresto.com/community/tutorials/workingwithdockervolumes/; (13 pp.).
Moving a file from the host system to a container via docker cp#5846; https://github.com/moby/moby/issues/5846; [retrieved on May 1, 2017];(33 pp.).

* cited by examiner

CONTAINER TESTING USING A DIRECTORY AND TEST ARTIFACTS AND/OR TEST DEPENDENCIES

BACKGROUND

Computer systems may run applications or services that are provided via a server or cloud. The applications or services can be developed and deployed as a single unit or as multiple units, such as a collection of microservices. Applications or microservices may run within containers, which may be run on physical or virtual machines. For example, containers may encapsulate a lightweight runtime environment for an application or a microservice. Application updates and new application features are often implemented in new containers. For example, software developers may frequently provide updates and additional application features to remain competitive in the microservices field.

SUMMARY

The present disclosure provides new and innovative systems and methods for testing applications running in containers using a directory, such as a volume mount. In an example, a system includes a memory, a processor in communication with the memory, a test manager executing on the processor, and a test controller executing on the processor. The test manager runs on a host operating system (OS) and executes on the processor to create a test container image including a test artifact and/or a test dependency. Then, the test manager distributes a set of tests, which are accessible to a test container created from the test container image. The test manager distributes the set of tests by populating a directory with the set of tests and mounting the directory to the test container. Additionally, the test manager executes the test container image. The test controller is associated with the test container and executes on the processor to execute the set of tests accessible to the test container using the test artifact and/or the test dependency. The test controller also monitors the set of tests executed by the test container. Additionally, feedback corresponding to the set of tests is provided.

In an example, a method includes creating, by a test manager running on a host, a test container image including a test artifact and/or a test dependency. Then, the test manager distributes a set of tests, which are accessible to a test container created from the test container image. The test manager distributes the tests by populating a directory with the set of tests and mounting the directory to the test container. Additionally, the test manager executes the test container image. Then, a test controller associated with the test container executes the set of tests accessible to the test container using the test artifact and/or test dependency. The test controller monitors the set of tests executed by the test container. Additionally, feedback corresponding to the set of tests is provided.

In an example, non-transitory machine readable medium stores code and is executed by a processor. The processor causes a test manager to create a test container image including a test artifact and/or a test dependency. Additionally, the test manager distributes a set of tests, which are accessible to a test container created from the test container image, by populating a directory with the set of tests and mounting the directory to the test container. The test manager executes the test container image. Additionally, the processor causes a test controller associated with the container to execute the set of tests accessible to the test container using the test artifact and/or the test dependency. The test controller monitors the set of tests executed by the test container. Additionally, feedback corresponding to the set of tests is provided.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
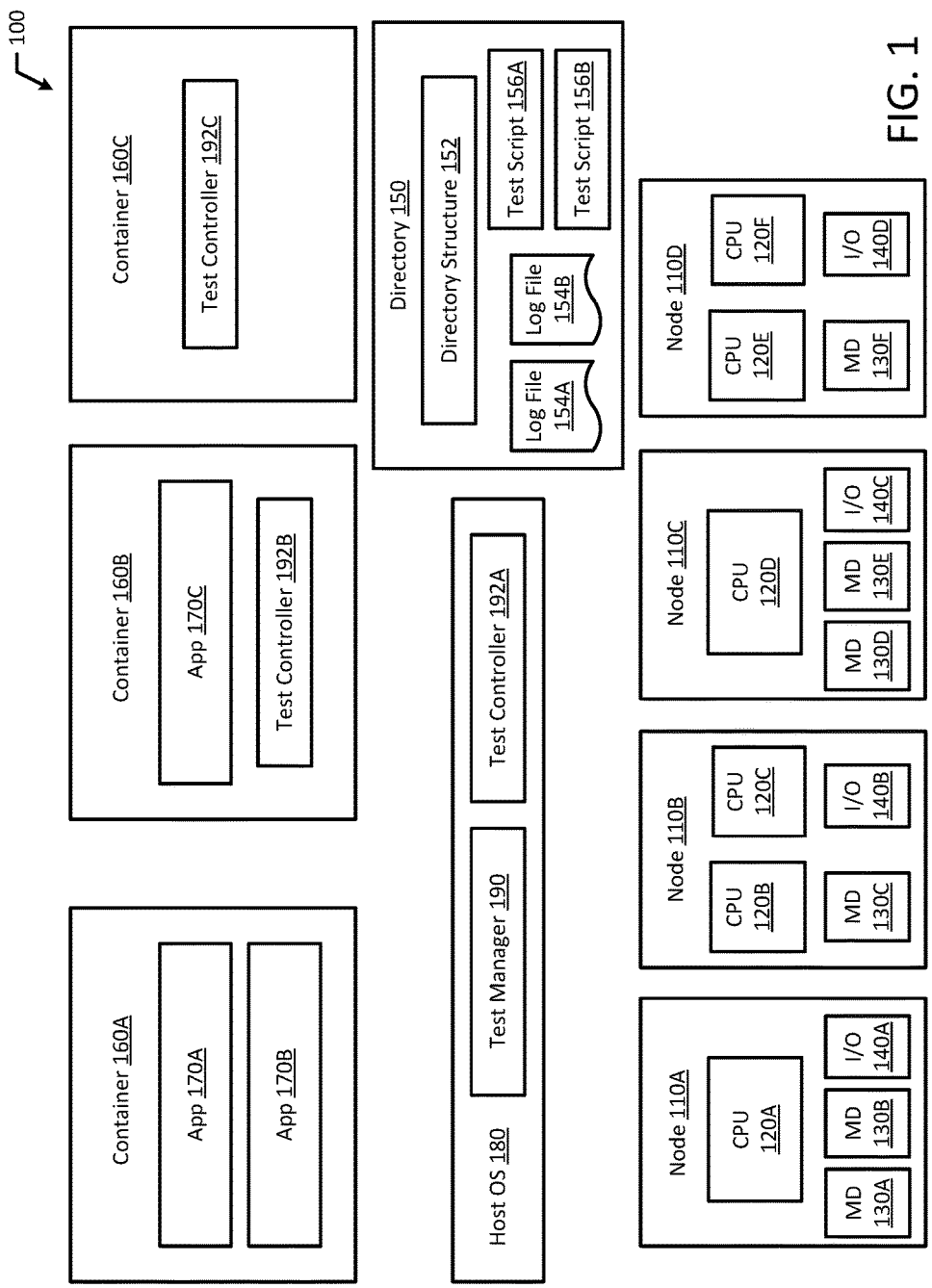
FIG. 1 illustrates a block diagram of an example container system according to an example embodiment of the present disclosure.

Techniques are disclosed for deploying and running tests inside a test container to test the functionality of a container application. Updates and new applications or added application features implemented in containers may result in container crashes. These crashes may result in the applications, such as microservices on the cloud, becoming unstable resulting in downtime while application code and/or application configuration files (e.g., dependencies, artifacts, libraries) are fixed and updated. For example, a new application or an application update may not be compatible with the runtime environment provided by the container, resulting in an application crash, container crash, etc. These crashes can be costly as they may cause errors for customers using the cloud.

Services, microservices, and/or applications may run in a software container, such as a test container. Software containers allow the creation of reproducible runtime environments for tested applications, such that the runtime environments have the appropriate application dependencies, libraries, static data, etc. By creating a test runtime environment to test applications, for example, even if tests are destructive for an application or leave the application in a non-default state, the resulting flawed container with the tested application can be killed and restarted (or a new container can be started) with default configuration options. Killing and restarting containers can be achieved quickly as containers typically use a lightweight virtualization on the operating system level. However, tests and test data stored on the container filesystem may be lost during a container crash and/or restart. For example, when a test application crashes, its corresponding container may crash or exit, and the container filesystem may not be accessible. Losing test data may make fixing applications more burdensome for application developers and may result in increased downtime associated with fixing applications.

In order to monitor and manage the testing process in further detail, and minimize downtime associated with container crashes, the systems and methods disclosed herein use a two-part test framework. The test framework includes a test manager running on the host system and a test controller that may be inside a running container or outside a running container, but with full ability to control the processes running inside containers. For example, a test manager creates a testing environment by building a test container image that includes the appropriate test artifacts and test dependencies. A test controller is also added as part of the testing environment. Individual sets of tests are distributed into a test container built from the test container image. The test controller runs the distributed sets of tests from a directory or volume mount and monitors the tests inside the running container. Additionally, test feedback may be provided by the test controller or container. By using volume mount, which includes a directory on the host system, the directory will persist on the host filesystem even if the container crashes during testing, and the testing results and logs that have already been recorded are advantageously preserved. The preservation of test data reduces developer redesign and troubleshooting time as test failure and test error data can be reviewed from the host filesystem, even when a container crashes, such that applications and configuration files can be updated accordingly.

The systems and methods disclosed herein advantageously record testing results inside the directory on the host filesystem, which can be accessed directly by a user. The system does not require any additional steps to report test results and advantageously preserves results in case of a container crash. In situations where restarting the container is not possible, the directory in the volume mount advantageously enables analysis of various crashes and other test information because logs (e.g., error log, output log) placed in the volume mount directory are preserved on the host filesystem, which is unaffected when a container crashes.

FIG. 1 depicts a high-level component diagram of an example container system 100 in accordance with one or more aspects of the present disclosure. The container system 100 may include a test manager 190, a test controller (e.g., test controller 192A-C), and a directory 150 that implement tests on containers 160A-B.

Test manager 190 runs on the host system (e.g., host OS 180) and is responsible for managing testing processes. For example, the test manager 190 may create runtime environments by creating test container images. Additionally, the test manager 190 may be responsible for starting, killing, and removing containers (e.g., container 160A-B).

As illustrated in FIG. 1, test controllers 192A-C may reside in various locations in container system 100. For example, test controllers 192A-C are depicted in three locations for illustration purposes without limiting the disclosure as requiring any particular location as illustrated. For example, the container system 100 may include a single test controller 192A on the host OS 180. The test controller (e.g., test controller 192A-C) may be responsible for running tests in one or more containers 160A-B. In another example, the container system 100 may include one or more test controllers 192B, with a test controller within each container (e.g., container 160B) that is performing testing. For example, container system 100 may include a single test manager 190 and a single test controller 192B running within a single container 160B. Additionally, container system 100 may include one or more test controllers 192C in respective container(s) 160C that are used to control tests on applications 170 in test containers. For example, test controller 192C may be used to execute tests in one or more test containers 160A. Additionally, container system 100 may include multiple test containers (e.g., container 160A) with multiple respective dedicated test controllers (e.g., test controller 192C) in different containers (e.g., container 160C).

Additionally, the test manager 190 may distribute tests into directory 150 by utilizing Network File System ("NFS") allowing the directory 150 to access files over a computer network much like local storage is accessed. For example, tests may be provided through a network by first being mounted on the host OS 180 using NFS and then the NFS mounted directory from the host OS 180 is mounted to the test container 160 using a volume mount. Similarly, the test may be executed through the network. For example, the test controller (e.g., test controller 192A-C, generally referred to as test controller 192) may execute tests through a network. For example, test controller 192A may execute tests in container 160A through a network. Additionally, test controller 192C may execute tests in container 160A through the network.

In an example, tests may also be executed offline. For example, tests may be executed without access to any network connection. In an example, tests may be run on an application in test container 160A via test controller 192C in test container 160C while the container system 100 is offline.

Directory 150 may include a directory structure 152 that designates memory locations of log files 154A-B and test scripts 156A-B. Log files 154A-B may include operational logs, error logs, test logs, etc. Test scripts 156A-B may include various tests and configuration settings for an application. For example, each test script 156A-B may be designed to evaluate a specific function or feature of an application 170. Test scripts 156A-B may include a single test or multiple tests. Additionally, tests may be run in series or in parallel.

Containers 160A-C may execute applications (e.g., applications 170A-C) or services, such as microservices. In an example, containers 160A-C may each run a process or service and may be any execution environment. For example, containers 160A-C may be treated as a single unit of deployment and may be stand-alone execution environments, similar to that of a virtual machine. Additionally, containers 160A-C may be servers, such as virtual servers. In an example, containers 160A-C may be organized in pods and may be co-located on the same node (e.g., node 110A) or host and share the same resources. For example, containers 160A-C may be located on node 110A and share the same resources, network, memory, and storage of the node 110A (e.g., CPU 120A, memory devices 130A-B, and input/output device(s) 140A). In another example, each container 160A-C may be located on its own node (e.g., nodes 110A-C). For example, container 160A may be located on node 110A while container 160B is located on node 110B. Containers 160A-B built with a test layer may be test containers.

A test container (e.g., container 160B) may include a test controller 192B. Additionally, the test controller 192C may be separate from the test container. For example, test controller 192C may run in container 160C, which may control tests for applications 170A-B within test container 160A. Similarly, test controller 192B may execute tests associated with application 170C and container 160B. As illustrated in FIG. 1, container 160B includes both an application 170C and a test controller 192B. Additionally, the test controller (e.g., test controller 192A) may run directly on a host OS 180 and may run tests on applications on various test containers 160.

Directory 150, containers 160A-C, and host OS 180 may run on a single node 110A. Additionally, directory 150, containers 160A-C, and host OS 180 may be distributed over several nodes (e.g., nodes 110A-D).

Each node 110A-D may in turn include one or more physical processors (e.g., CPU 120A-F) communicatively coupled to memory devices (e.g., MD 130A-F) and input/output devices (e.g., I/O 140A-D). As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-F may be provided by one or more local buses of suitable architecture, for example, peripheral component interconnect (PCI).

Figure 2:
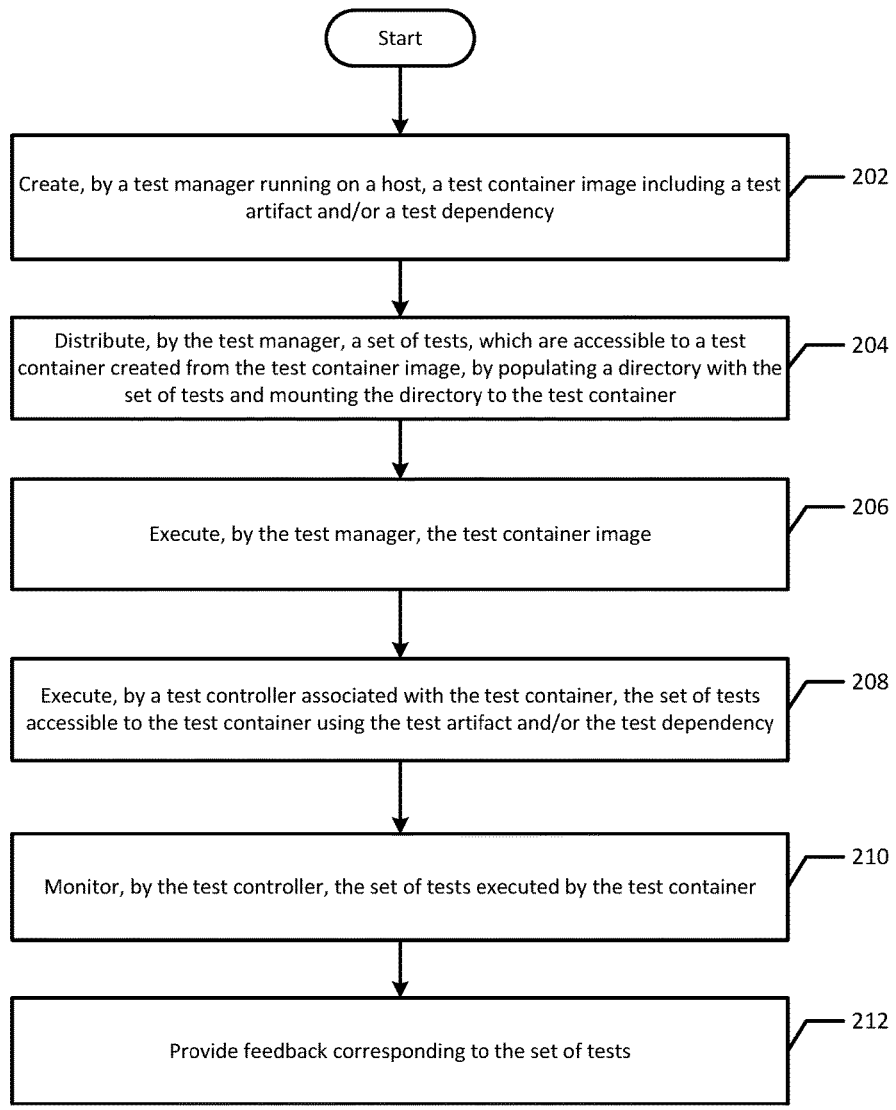
FIG. 2 illustrates a flowchart of an example process for testing applications running in a container according to an example embodiment of the present disclosure.

FIG. 2 illustrates a flowchart of an example method 200 for testing applications running in containers in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes a test manager running on a host creating a test container image including a test artifact and/or a test dependency (block 202). For example, a test manager 190 running on a host OS 180 may create a test container image that includes test artifacts and test dependencies. The test manager may provide the requested and/or expected test dependencies such as testing tools, package management software (e.g., Red Hat Package Manager or other package management tools), etc. In an example, test dependencies may include dependencies that are not required for normal use of the application, such as dependencies that are available for the test compilation and test execution phases. Dependencies may also include runtime dependencies that are required for execution, compile dependencies used during application compilation, system dependencies, etc. Then, the test manager distributes a set of tests, which are accessible to a test container created from the test container image, by populating a directory with the set of tests and mounting the directory to the test container (block 204). For example, the test manager 190 may populate a directory 150 with a set of tests and mount the directory 150 to the test container 160. In an example, the test manager 190 may distribute tests into directory 150 by copying the tests into the directory 150 from a local tests database. For example, tests may be distributed by linking, namespacing, etc. a specified subset of tests into the directory 150 from one or more local or remote test databases. Additionally, the test manager 190 may distribute tests into directory 150 by utilizing Network File System ("NFS") allowing the directory 150 to access files over a computer network much like local storage is accessed. For example, tests may be provided through a network by first being mounted on the host OS 180 using NFS and then the NFS mounted directory from the host OS 180 is mounted to the test container 160 using a volume mount. Volume mount or data volume may also be referred to as a data volume mount point. The volume mount may be read-write directory on a local (e.g., host) or remote filesystem. For example, the volume mount may be a host directory, a shared storage volume, or a mounted file.

In an example, the tests may be pulled from a directory 150 according to directory structure 152, which may indicate the location and/or size of test scripts 156 within the directory 150. For example, the directory structure 152 and test scripts 156 for "App 170A" tests and "App 170B" tests may resemble:

```
--App 170A tests
    --test_1
        -- Makefile
        -- PURPOSE
        -- runtest.sh (156)
        -- test.ini (156)
    --test_2
        -- Makefile
        -- PURPOSE
        -- runtest.c (156)
        -- test.ini (156)
    --test_3
        -- Makefile
        -- PURPOSE
        -- runtest.sh (156)
        -- test.ini (156)
--App 170B tests
    --test_4
        -- test.ini (156)
        -- test.sh (156)
    --test_5
        -- runtest.sh (156)
        -- test.ini (156)
        -- test.c (156)
    --test_6
        -- runtest.sh (156)
        -- test.ini (156)
```

Then, the test manager executes the test container image (block 206). For example, the test manager 190 may execute the test container 160 from the test container image. In an example, the test container image includes several test dependencies and test artifacts, such that the test dependencies and test artifacts are installed inside the test container 160 once the test container is executed. Additionally, the test manager 190 may configure the test container image such that when starting the test container 160 from that image, the containerization technology knows which directory 150 is mounted to the container 160.

Once the test container is executing, a test controller associated with the test container executes the set of tests accessible to the test container using the test artifact and/or the test dependency (block 208). For example, a test controller 192 may execute the set of test using a test artifact and/or a test dependency. In an example, the test controller 192 may start a test script 156, which may, for example, represent a test that configures an application 170 and its dependencies and executes the application 170 in order to perform the test. Additionally, the test controller 192 may execute tests associated with the application 170 to test the functionality of the application 170. In an example, the test controller 192 may be responsible for executing the application 170 that the tests are designed to evaluate. In another example, a test script 156 may execute the application 160. For example, a test script 156 may instruct the application 170 to start. Additionally, a test script 156 may instruct the application 170 to start or restart with a new configuration.

Typically, tests may be run in series or in parallel. For example, multiple tests may be executed at the same time. Additionally, tests may be executed separately, for example, after a previous test is finished. In an example, an application 170 may be evaluated using multiple tests, such as six tests (e.g., $test_1$, $test_2$, $test_3$, $test_4$, $test_5$, and $test_6$), some of which may start at the same time while others are executed after completion of previous tests. For example, $test_1$, $test_2$, and $test_3$ may run in parallel (e.g., start at the same time or execute concurrently). Then, after $test_1$, $test_2$, and $test_3$ are finished, $test_4$ may be executed separately. After $test_4$ finishes, $test_5$ and $test_6$ may be run in parallel. In an example, tests that run in parallel may be positioned on the same line in a test configuration file or a test script 156, for example:

test configuration
        $test_1$, $test_2$, $test_3$
        $test_4$
        $test_5$, $test_6$ The test controller monitors the set of tests executed by the test container (block 210). For example, the test controller 192 may monitor test execution in the test container 160. In an example, the test controller 192 may monitor when a test script 156 finishes. Additionally, the test controller 192 may monitor tests to determine when testing timeout is reached. For example, a test may die or timeout, or may result in an undesired application 170 behavior, which may cause the container 160 to crash.

Then, feedback corresponding to the set of tests is provided (block 212). For example, the test controller 192 may provide feedback corresponding to the tests running within the container 160. In an example, the test controller 192 may report a status of the set of tests, such as tests completed, $test_1$ completed, $test_2$ timed-out, $test_3$ failed, etc. Additionally, the test controller 192 may log test outputs corresponding to the tests into a log file(s) (e.g., log file 154A-B, generally referred to as log file 154) on the directory 150. For example, the test controller 192 may write outputs or log outputs from test scripts 156 into an output log and may place log files 154 related to test failures and/or errors into an error log. Similarly, the test controller 192 may log other files created during testing into the directory 150, such as application log files, binary files, etc. The test controller 192 may report test results, for example, in the form of a return code. Additionally, the test container 160 may provide feedback corresponding to the tests running within the test container 160. For example, the test container 160 may report a status of the set of tests and may log test outputs into log files 154.

In an example, test manager 190 may read the log files 154 within directory 150. For example, directory 150 may be a read-write directory. For example, test manager 190 may write test scripts into directory 150, test controller 192 may write test outputs and other test information into log files 154, test controller 192 may read test scripts from directory 150, and test manager 190 may read test outputs from directory 150. A user may poll the test manager 190 for job status. Additionally, a user may observe test job status by reading a dedicated log file, for example, by consuming standard output and/or error stream, etc.

In another example, the test may be configured to create files inside directory 150. For example, test outputs and other test files may be written directly into the directory 150, which may be accessible from the host OS 180, according to instructions from test scripts 156.

Figure 3A:
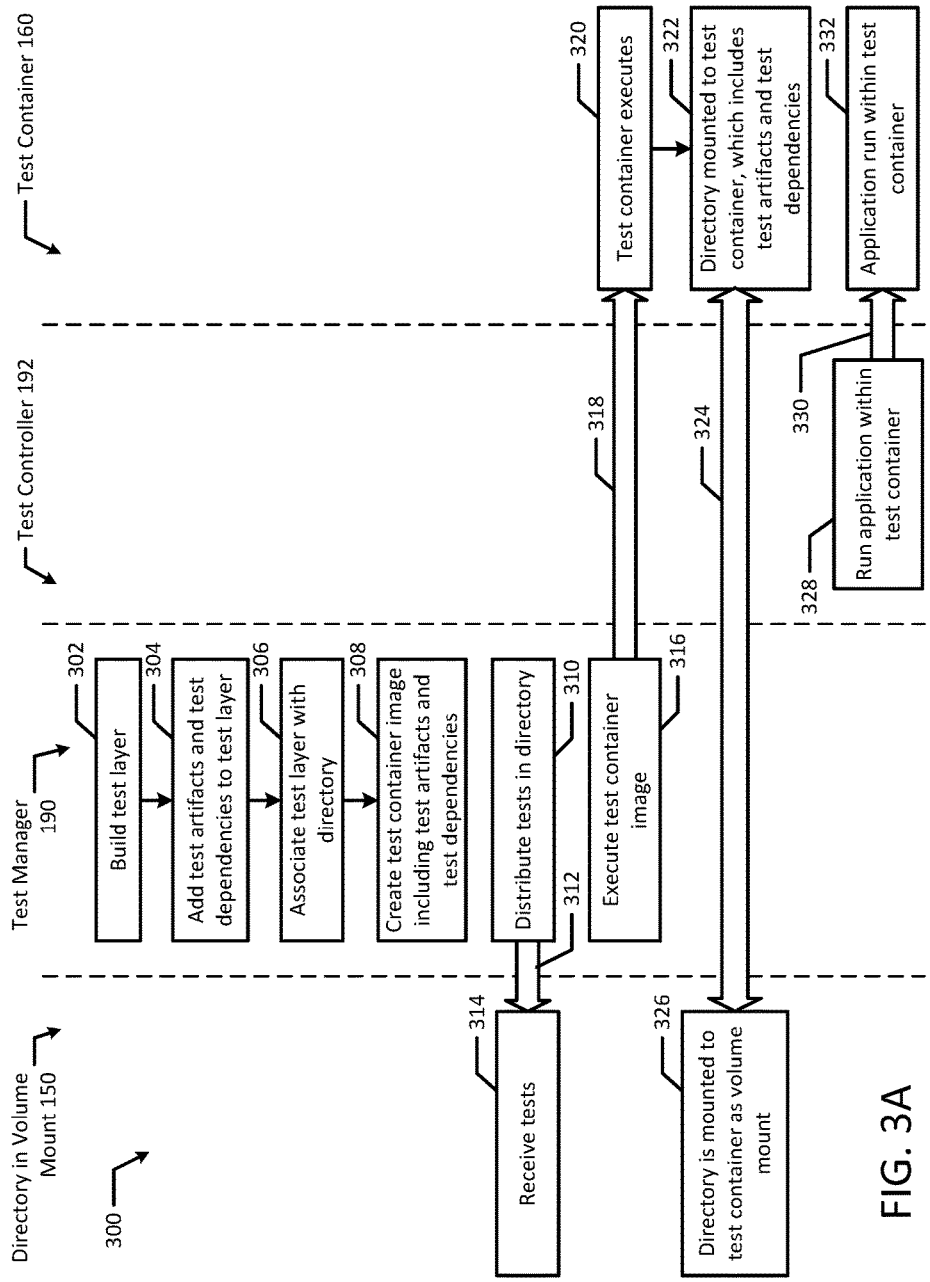
FIGS. 3A and 3B illustrate a flow diagram of an example process for testing applications running in a container using a directory in volume mount according to an example embodiment of the present disclosure.
Figure 3B:
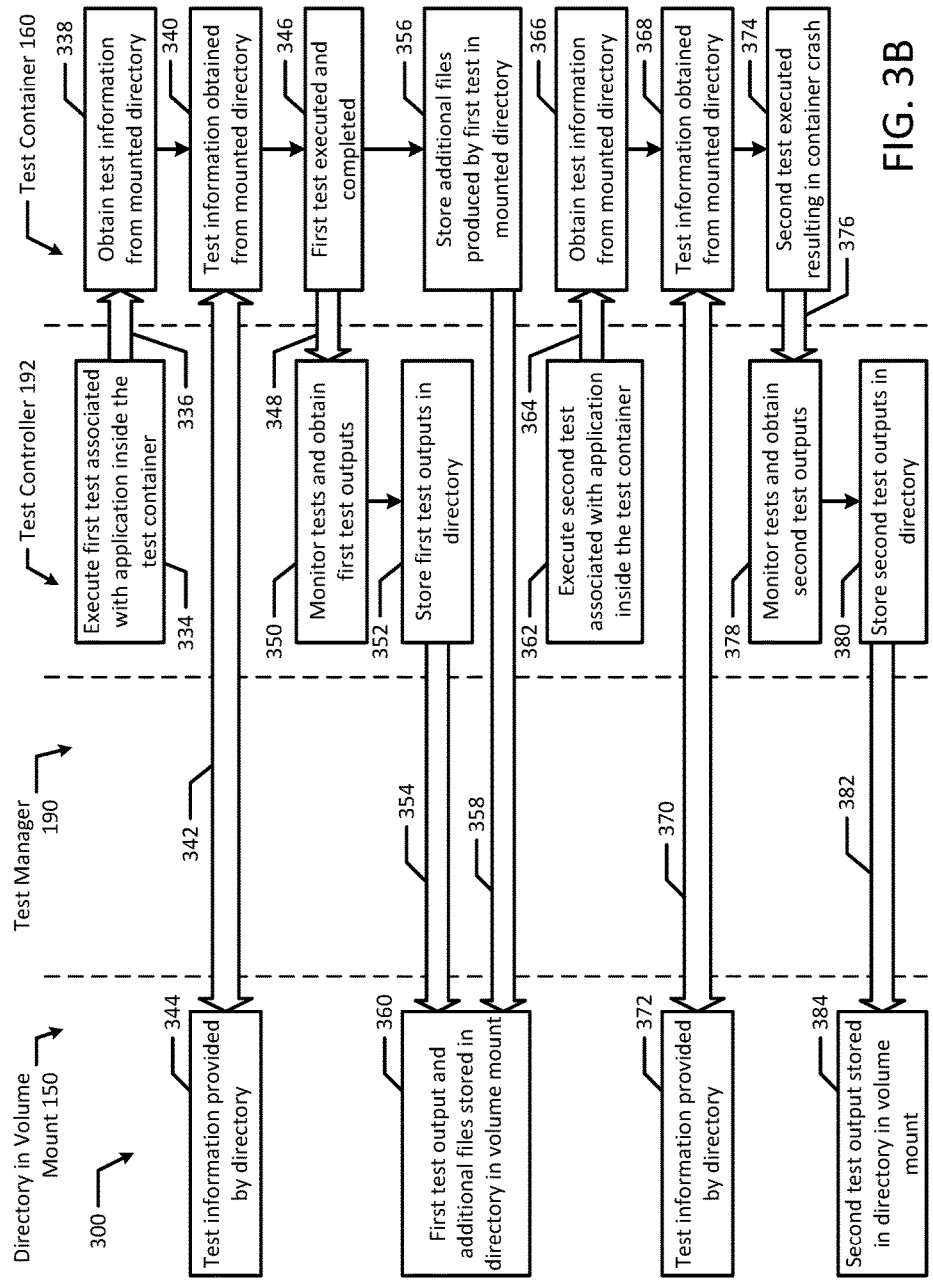

FIGS. 3A and 3B illustrate a flowchart of an example method 300 for testing applications running in containers using volume mount. Although the example method 300 is described with reference to the flowcharts illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by a test manager 190, a test controller 192, a test container 160, and a directory 150 in volume mount.

In the illustrated example, test manager 190 builds a test layer (block 302). For example, the test manager 190 may build a test layer above a base layer of the test container image. In an example, the base layer may include the same application information and application configuration files (e.g., application dependencies, application libraries, application artifacts) as the runtime application container. Then, the test manager 190 adds test artifacts and test dependencies to the test layer (block 304). For example, the test manager 190 may build a test layer that includes one or more test artifacts and/or test dependencies. In an example, the test layer may include test libraries, test configuration files, etc. The test manager 190 also associates the test layer with a directory 150 (block 306). For example, the test manager 190 may configure the test layer such that when starting the test container 160 from the entire test container image (e.g., test layer and base layer), the containerization technology mounts the appropriate directory 150 to the test container 160. Then, the test manager 190 creates a test container image including the test artifacts and test dependencies (block 308). For example, after construction the test layer with the artifacts, dependencies, and directory configuration, the test manager 190 builds the complete test container image, which can be started as a test container 160.

The test manager 190 distributes tests in the directory 150 (blocks 310 and 312). For example, the test manager 190 may distribute tests into the directory 150 using a volume mount by copying the tests into the directory 150 from a local test database. For example, the test manager 190 may distribute tests into directory 150 by utilizing Network File System ("NFS") allowing the directory 150 to access files over a computer network much like local storage is accessed. For example, tests may be provided through a network by first being mounted on the host OS 180 using NFS and then the NFS mounted directory from the host OS 180 is mounted to the test container 160 using the volume mount. Next, the directory 150 receives the tests (block 314). As discussed above, the directory 150 in volume mount may receive the tests 150 from another directory, for example, the tests may be copied, linked, namespaced, etc. from another directory into the mounted directory 150. By using volume mount, information is advantageously preserved in case of a container crash. Further, volume mount does not require a network connection, so testing can advantageously be achieved offline, thereby providing a lightweight solution that is protected against network downtime and container crashes.

The test manager 190 executes the test container image (blocks 316 and 318). For example, the test manager 190 may execute the test container image or start the test container 160 from the test container image. Then, the test container 160 executes (block 320). Then, the directory 150 is mounted to the test container (blocks 322, 324, and 326). As discussed above, the test container image is built in such a way that when the test container 160 is started, the containerization technology knows which directory 150 is mounted to the container 160. When the test container 160 is started, the test container 160 includes the test artifacts and test dependencies added to the test layer by the test manager 190 and also has the directory 150 mounted to the test container 160 such that the container 160 includes all the required test runtime configurations without having to retrieve them from a remote location. For example, the directory 150 is mounted to the test container 160 using a volume mount to distribute the set of tests accessible to the test container.

After the container 160 is started, the test controller 192 runs the application 170 within the test container 160 (blocks 328 and 330). For example, the test controller 192 may run the application 170 within the container 160 by configuring the application 170 and executing the application 170. In an example, the test controller 192 may run a test script 156 that represents a test, which configures the application 170 and its dependencies and executes the application 170 in order to perform the test. Then, the application 170 is run within the test container 160 (block 332). For example, the test controller 192 may execute or run the application 170 within the test container 160 to ensure that the container 160 is configured properly. In an example, if the application fails to run, the container 160 may be stopped or destroyed by the test manager 190.

After the application 170 executes, the test controller 192 executes a first test associated with the application 170 inside the test container 160 (blocks 334 and 336). For example, the test controller 192 may execute a first test script 156A (e.g., test$_1$) inside the test container 160. Then, the test container 160 obtains test information from the mounted directory 150 (block 338). For example, the test container 160 may obtain test information such as a test script 156A from the directory 150 in volume mount via instruction from the test controller 192. In an example, test scripts (e.g., test scripts 156A-B) may be organized in directory 150 according to the directory structure 152, which may indicate the memory location of each test script 156A-B. The test information is obtained from the mounted directory 150 (blocks 340, 342, and 344). As discussed above, test information, such as test scripts 156 are obtained from the directory 150 in volume mount. For example, tests, such as test scripts 156 are maintained on a filesystem, such as the host filesystem, which is outside of the container 160. Therefore, test scripts 156 are unaffected by container crashes and will remain in the directory 150 even after a container crashes, malfunctions, or is destroyed. Further, maintaining test scripts 156 on the host filesystem advantageously enables tests to be changed or new test scripts 156 added to the directory 150 without rebuilding the test container image. If the tests were loaded into the test container 160, a crash may corrupt the container filesystem and tests may need to be reloaded into a new container, which would increase overhead. Similarly, if test scripts 156 are stored in the container, test container images may need to be rebuilt each time tests are changed or new test scripts 156 are added to the test container. Additionally, if test scripts 156 were loaded into the container filesystem, additional script backups would be required in case test scripts 156 were lost due to container 160 crashes.

Then, the first test is executed and completed (block 346). For example, tests are executed from the directory 150 by the test controller 192 using the test artifacts and test dependencies within the test container 160. In an example, the tests and/or test scripts are outside of the test container (e.g., in the mounted directory 150, which may be located on the host), while the test dependencies and test artifacts are built into the test container 160, such that the container 160 has the required libraries, configurations, etc. within the container 160. Then, the test controller monitors tests and obtains first test outputs (blocks 348 and 350). For example, the test controller 192 may monitor when test scripts 156 finish and may receive outputs from the first test. In an example, test controller 192 may monitor tests for test timeout (e.g., to determine when testing timeout is reached), for example, if a test dies, malfunctions, or displays undesired test behavior. Test timeout limits may be established within a test script 156 and may be test dependent. Additionally, the test controller 192 may use a predetermined test timeout limit, such as testing time (e.g., 4 seconds, 30 seconds, 3 minutes), CPU cycles by using a CPU cycle counter, or the like.

When test timeout is reached, the test controller 192 may kill or destroy the current test process, log the action taken (e.g., write "test killed" entry in error log on directory 150), and then proceed to the next test. For example, the test controller 192 may control how to access testing and which order to execute tests. Since the test controller 192 can un-block future tests, for example by killing a stalled test, the test controller 192 advantageously allows test data to be obtained and recorded for the remaining application 170 tests, thereby providing as much information as possible to developers for each test run.

Then, the test controller 192 stores the first test outputs in the directory 150 (blocks 352 and 354). For example, the test controller 192 may store test outputs associated with the first test, such as data packets transformed by the test, test pass information, etc. in the directory 150 in volume mount. Additionally, the test container 160 stores additional files produced by the first test in the mounted directory 150 (blocks 356 and 358). For example, the test container 160 may store additional files such as application log files, binary files, etc. into one or more log files (e.g., log file 154A-B) of the directory 150. Then, the first test outputs and the additional files are stored in the directory 150 in volume mount (block 360). For example, the first test outputs may be stored in an output log on the directory 150 while additional files, such as test errors are stored in an error log on the directory 150 in volume mount. In an example, the test script 156 may directly write test outputs to the directory 150.

The test controller 192 executes a second test associated with the application 170 inside the test container 160 (blocks 362 and 364). For example, the test controller 192 may execute a second test script 156B (e.g., test$_2$) inside the test container 160. In an example, the second test may include multiple test scripts 156 run in parallel (e.g., run simultaneously). For example, after the first test, the test controller 192 may start multiple tests scripts at the same time, which make up the second test. Then, the test container 160 obtains test information from the mounted directory 150 (block 366). For example, the test container 160 may obtain test information such as a test script 156B from the directory 150 in volume mount. In an example, the second test script 156B may be organized in directory 150 according to the directory structure 152, which may indicate the memory location of the second test script 156B. The test information is obtained from the mounted directory 150 (blocks 368, 370, and 372). As discussed above, test information, such as test scripts 156 are obtained from the directory 150 in volume mount. These test scripts 156 may be obtained with or without a network connection, which advantageously provides a testing environment that can be executed while offline or during network downtimes.

Then, the second test is executed resulting in a container crash (block 374). For example, the second test may crash the container 160 due to improper container configuration (e.g., improper test dependencies, improper test artifacts, etc.). During execution, the test controller 192 monitors tests and obtains second test outputs (blocks 376 and 378). For example, the test controller 192 may monitor when the second test scripts 156B finish and may receive outputs from the second test. In an example, test controller 192 may monitor tests for test timeout, such as exceeding a predetermined testing time or quantity of CPU cycles.

Then, the test controller 192 stores the second test outputs in the directory 150 (blocks 380 and 382). For example, the test controller 192 may store test outputs associated with the second test, such as transformed packets, test fail information, etc. in the directory 150 in volume mount. Additionally, the test container 160 stores the second test outputs in the mounted directory 150 (block 384). For example, the second test outputs may be stored in an output log on the directory 150 while additional files, such as test errors are stored in an error log on the directory 150 in volume mount. As discussed above, by writing test outputs into the directory (e.g., into log files 154), the test results are preserved and unaffected by a container crash because the volume mounted directory is on the host filesystem. Preserving these records may reduce the time it takes to fix the application, such that the updated application can be provided to customers more efficiently.

Figure 4:
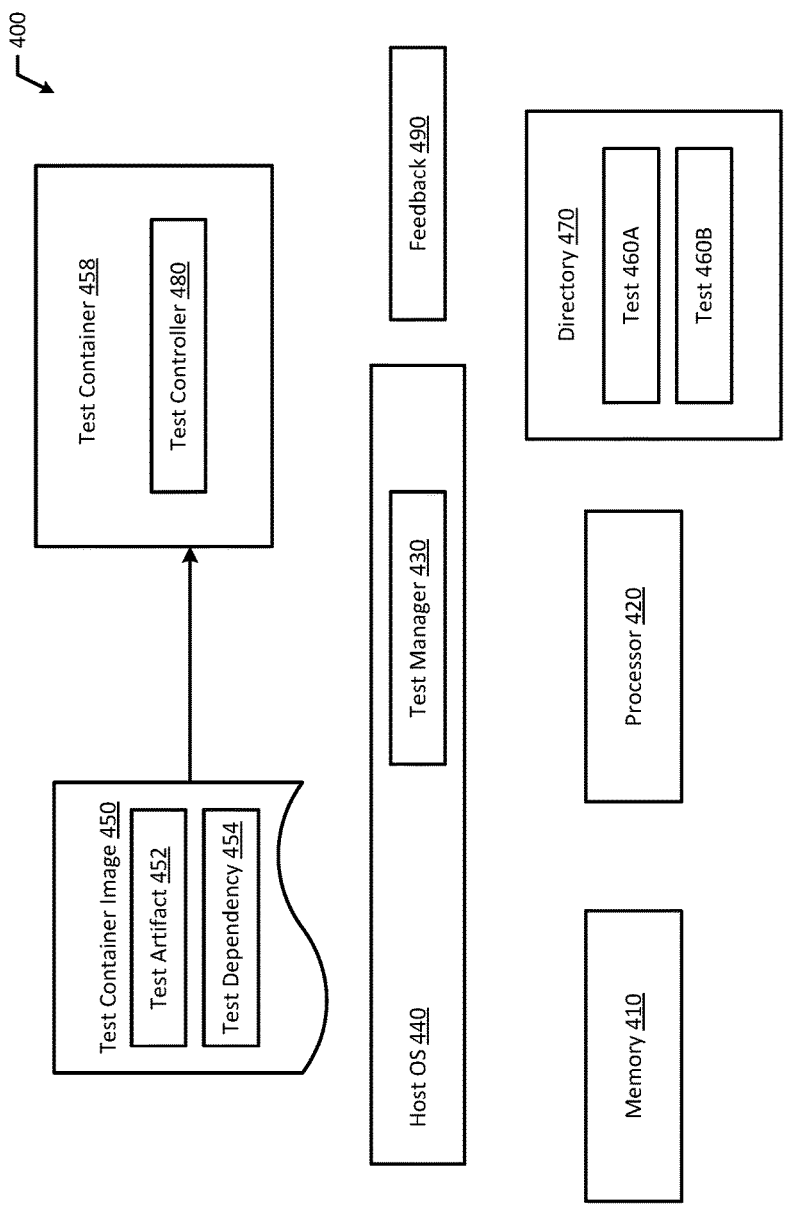
FIG. 4 illustrates a block diagram of an example container system for testing applications running in a container according to an example embodiment of the present disclosure.

FIG. 4 is a block diagram of an example container testing system 400 according to an example embodiment of the present disclosure. The container testing system 400 may include a memory 410, a processor 420 in communication with the memory 410, a test manager 430 executing on the processor 420, and a test controller 480 executing on the processor. The test manager 430 may run on a host operating system (OS) 440 and may execute on the processor 420 to create a test container image 450 including a test artifact 452 and a test dependency 454. The test manager 430 may distribute a set of tests 460A-B, which are accessible to a test container 458 created from the test container image 450. The test manager 430 distributes the set of tests 460A-B by populating a directory 470 with the set of tests 460A-B and mounting the directory 470 to the test container 458. Additionally, the test manager 430 may execute the test container image 450 (e.g., execution of the test container image 450 forms the test container 458). The test controller 480 is associated with the test container 458 and executes on the processor 420 to execute the set of tests 460A-B accessible to the test container 458 using the test artifact 452 and/or the test dependency 454. The test controller 480 may also monitor the set of tests 460A-B executed by the test container 458. Additionally, feedback 490 corresponding to the set of tests 460A-B may be provided.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one processor in communication with the memory;
a test manager executing on the at least one processor, the test manager running on a host operating system (OS), wherein the test manager executes on the at least one processor to:
create a test container image including at least one of a test artifact and a test dependency,
distribute a set of tests, which are accessible to a test container created from the test container image, by populating a directory with the set of tests and mounting the directory to the test container, and
execute the test container image; and
a test controller executing on the at least one processor, the test controller associated with the test container, wherein the test controller executes on the at least one processor to:
execute the set of tests accessible to the test container using at least one of the test artifact and the test dependency,
monitor the set of tests executed by the test container, and
provide feedback corresponding to the set of tests.

2. The system of claim 1, wherein the test controller executes on the at least one processor to destroy the set of tests responsive to receiving a test timeout.

3. The system of claim 1, wherein the test controller runs on the host OS.

4. The system of claim 1, wherein the test controller runs within the test container.

5. The system of claim 1, wherein the test controller runs within a different container.

6. The system of claim 5, wherein the set of tests is executed through a network.

7. The system of claim 6, wherein an application associated with the container provides a network service.

8. A method comprising:
    creating, by a test manager running on a host, a test container image including at least one of a test artifact and a test dependency;
    distributing, by the test manager, a set of tests, which are accessible to a test container created from the test container image, by populating a directory with the set of tests and mounting the directory to the test container;
    executing, by the test manager, the test container image;
    executing, by a test controller associated with the test container, the set of tests accessible to the test container using at least one of the test artifact and the test dependency;
    monitoring, by the test controller, the set of tests executed by the test container; and
    providing feedback corresponding to the set of tests.

9. The method of claim 8, further including destroying, by the test controller, the set of tests responsive to receiving a test timeout.

10. The method of claim 8, wherein creating the test container image includes building a test layer including at least one of the test artifact and the test dependency above a base layer of the test container image.

11. The method of claim 8, wherein distributing the set of tests accessible to the test container uses a volume mount including the directory.

12. The method of claim 11, wherein the directory is automatically mounted to the test container after the test container is started.

13. The method of claim 8, wherein providing feedback corresponding to the set of tests includes logging at least one of test outputs and a file created during testing corresponding to the set of tests into one or more log files of the directory.

14. The method of claim 8, wherein running the set of tests by the test controller is triggered by the test manager executing the test container and the test controller successfully executing an application within the test container associated with the set of tests.

15. The method of claim 8, further comprising:
    starting, by the test manager, the test container;
    stopping, by the test manager, execution of the test container; and
    removing, by the test manager, the test container.

16. The method of claim 8, wherein providing feedback includes reporting a status of the set of tests.

17. A non-transitory machine readable medium storing code is executed by a processor, wherein the processor causes a test manager to:
    create a test container image including at least one of a test artifact and a test dependency,
    distribute a set of tests, which are accessible to a test container created from the test container image, by populating a directory with the set of tests and mounting the directory to the test container, and
    execute the test container image;
    wherein the processor causes a test controller associated with the container to:
    execute the set of tests accessible to the test container using at least one of the test artifact and the test dependency, and
    monitor the set of tests executed by the test container; and
    wherein the processor causes one of the test controller and the container to provide feedback corresponding to the set of tests.

18. The non-transitory machine readable medium of claim 17, wherein creating the test container image includes building a test layer including at least one of the test artifact and the test dependency above a base layer of the test container image.

19. The non-transitory machine readable medium of claim 17, wherein distributing the set of tests accessible to the test container uses a volume mount including the directory.

20. The non-transitory machine readable medium of claim 17, wherein providing feedback corresponding to the set of tests includes logging at least one of test outputs and a file created during testing corresponding to the set of tests into one or more log files of the directory.

* * * * *